United States Patent [19]

Zander

[11] 4,056,766

[45] Nov. 1, 1977

[54] COMMUTATION CIRCUIT FOR A CYCLOCONVERTER WITH INTERMEDIATE D.C. LINK

[75] Inventor: Hans-Hermann Zander, Erlangen, Germany

[73] Assignee: Siemens Aktiengesellschaft, Berlin and Munich, Germany

[21] Appl. No.: 661,426

[22] Filed: Feb. 26, 1976

[30] Foreign Application Priority Data

Mar. 10, 1975 Germany .............................. 2510357

[51] Int. Cl.² ............................................ H02M 5/257
[52] U.S. Cl. ..................................... 363/37; 318/227; 363/138
[58] Field of Search ............................ 321/4, 5, 45 C; 318/227

[56] References Cited

U.S. PATENT DOCUMENTS

| | | | |
|---|---|---|---|
| 3,544,879 | 12/1970 | King | 321/5 |
| 3,612,971 | 10/1971 | Blaschke | 318/227 |
| 3,656,006 | 4/1972 | Bourke et al. | 321/5 |
| 3,781,645 | 12/1973 | Grom et al. | 321/5 |
| 3,824,446 | 7/1974 | Forster et al. | 321/45 C |
| 3,932,798 | 1/1976 | Chalmers et al. | 321/45 C |

*Primary Examiner*—William H. Beha, Jr.
*Attorney, Agent, or Firm*—Kenyon & Kenyon, Reilly, Carr & Chapin

[57] ABSTRACT

In a cycloconverter including an intermediate d-c link, a controlled rectifier and a inverter having main thyristors in a bridge circuit with bypass diodes in a bridge connected antiparallel thereto, a quenching circuit including a quenching thyristor and a commutating capacitor is connected parallel to each bridge arm, there being provided for each two bridge circuits having a common main lead a common commutating capacitor and at least one common damping capacitor, the latter connected parallel to a bridge arm to reduce the current dependence of the commutation voltage present at the commutating capacitor.

10 Claims, 12 Drawing Figures

COMMUTATION CIRCUIT FOR A CYCLOCONVERTER WITH INTERMEDIATE D.C. LINK

BACKGROUND OF THE INVENTION

This invention relates to cycloconverters with intermediate d-c links in general and more particularly to an improved commutation circuit for such a cycloconverter.

Such cycloconverters with variable intermediate link voltage are known from the book by M. Mayer "Self-Commutating Thyristor Converters," Siemens A/G 1974, third edition, pages 162 to 168, and from the German Pat. No. 1,246,861. (See also Thyristor Phase-Controlled Converters and Cycloconverters by B. R. Pelly, published by Wiley Interscience-a division of John Wiley & Sons, Inc.). Because of their simplicity, they find widespread application, e.g., for supplying three phase machines. In these cycloconverters, a commutating capacitor is recharged after each forced commutation with the energy stored in the commutating inductance by the load current and from the energy of the intermediate link to cover the commutation losses. As a result, the ability to commutate remains assured even if the intermediate link voltage is small. With large load currents, particularly if the cycloconverter is overloaded, this current dependent recharging can lead to a large increase of the voltage at the commutating capacitor, i.e., the commutation voltage, and thereby to excessive stresses of the thyristors, the diodes and the capacitors in the cycloconverter. This danger exists particularly in the case of high power, e.g., powers of 100 kVA and more.

Thus, there is a need for a cycloconverter of the general type mentioned above which includes a commutation circuit designed in such a manner that excessively high commutation voltages are avoided.

SUMMARY OF THE INVENTION

According to the present invention, this problem is solved by providing at least one damping capacitor for each two bridge arms with a common main lead, which capacitor is connected parallel to one bridge arm.

In the cycloconverter according to the present invention, the time during which a load current dependent recharging of the commutating capacitor takes place is shortened for each commutation by a time span during which the damping capacitors associated with the commutating capacitor are discharged and reverse their charges. Thereby, the beginning of an increase of the commutation voltage is initially prevented almost without losses. This is accomplished completely independently of the cycloconverter frequency. The damping at an intermediate link voltage of zero volt is zero and increases with increasing intermediate link voltage. Thus, the ability to commutate due to the load current dependent recharging is fully preserved.

The capacities of the damping capacitors, which are preferably all the same value, and therefore, the damping action is limited only by circulating currents which occur when the cycloconverter is idling. The damping capacitors can preferably be disconnectable or an inductive base load may be connected to the output of the inverter for such operation. An inductive base load causes an inductive base load current to flow which reverses the charge of the damping capacitors between the reversal process and the start of the main pulse in the inverter and thereby prevents generation of a circulating current. It is advantageous to connect a choke with two magnetically coupled windings in each output line as the inductive base load. One winding of each choke is connected to the inverter output, the junction point of the two windings of each choke is connected to the load and the other winding of all chokes connected to each other. In this embodiment the base load current decreases with increasing load current and, with proper design, becomes zero at the nominal (rated) current. At rated operation the commutating equipment and the main thyristors are therefore no longer loaded by the base load current.

In the following, the cycloconverter according to the invention will be explained in detail by way of example, referring to FIGS. 1 to 9. In the figures, several embodiments of the cycloconverter according to the present invention are shown. Similar components are always labelled with the same reference symbols.

DETAILED DESCRIPTION OF THE PREFERRED EMBODIMENT

Figure 1:
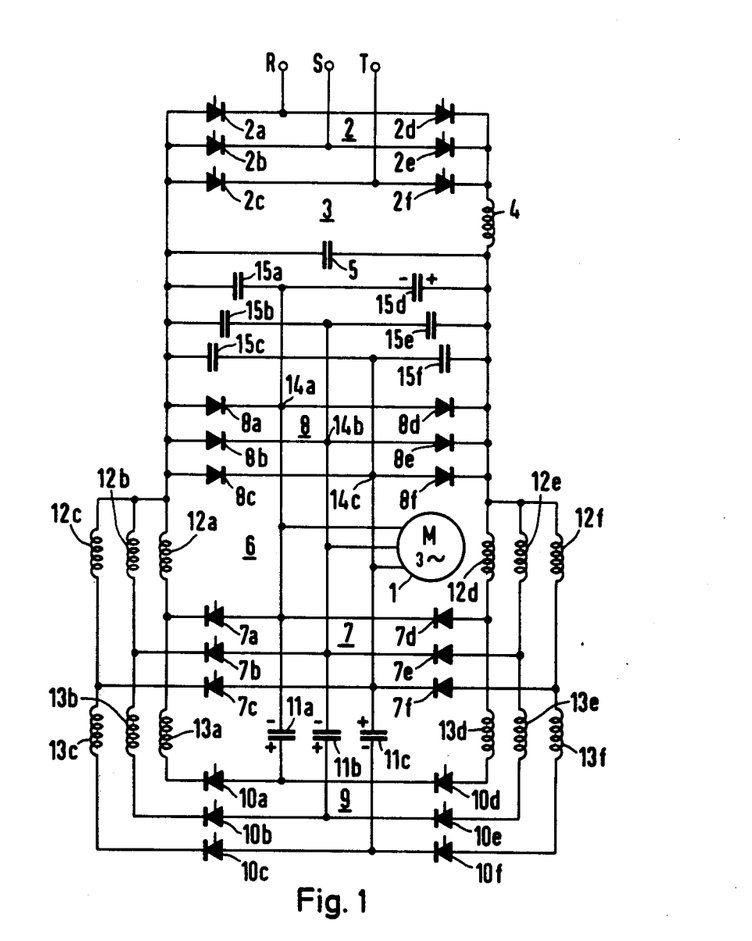
FIG. 1 is a circuit diagram of a first embodiment of the present invention.

FIG. 1 illustrates a three phase machine 1, which may be a synchronous or an asynchronous three phase machine, supplied from a three phase network with the phases R, S, T through an externally controlled, line commutated rectifier 2, an intermediate d-c link 3 with smoothing chokes 4 and an intermediate link capacitor 5, and a self commutating, externally controlled inverter 6. In this invention, the rectifier 2 is comprised of six controlled thyristors 2a to 2f in a three phase bridge circuit. The inverter 6 comprises main thyristors 7a to 7f in a three phase bridge circuit 7 and bypass or reverse current diodes 8a to 8f in a three phase bridge circuit 8, the two bridge circuits 7 and 8 being connected antiparallel such that a diode 8a to 8f is connected with opposite polarity to each main thyristor 7a to 7f.

The inverter is equipped with a forced commutation arrangement 9 for the main thyristors 7a to 7f. In arrangement 9 a quenching circuit consisting of one of the quenching thyristors 10a to 10f in series with one of the commutating capacitors 11a to 11c is shunted across each main thyristor 7a to 7f. A common commutating capacitor 11a to 11c is in each case provided for each two main thyristor bridge arms which have a common main lead 14a to 14c e.g. for the bridge arms with thyristors 7a to 7f. These bridge arms with a common main lead 14a to 14c are also called bridge branches. Commutating chokes 12a to 12f and limiting chokes 13a to 13f are also connected into the commutation circuit. In this embodiment, the limiting chokes are connected between the main thyristors 7a to 7f and the associated quenching thyristors 10a to 10f and the commutating chokes 12a to 12f between the main thyristors 7a to 7f, and the associated bypass diodes 8a to 8f. Furthermore, in the embodiment of FIG. 1, the commutating chokes 12a to 12f are subdivided and one of the commutating chokes 12a to 12f is associated with each main thyristor 7a to 7f. This arrangement of the commutating chokes 12a to 12f decouples the commutation circuits so that the permissible reverse voltage of the particular thyristors which are employed can be better utilized. For the operation of the cycloconverter according to the present invention, the specific arrangement of the commutating and limiting chokes illustrated by FIG. 1 is not important; the commutating and limiting chokes can also be arranged at other points of the commutation circuit.

It was noted above that the current dependent recharging of the commutating capacitors 11a to 11c during forced commutation can lead to an excessively large increase of the commutation voltage in the case of an overload. In order to prevent such an excessively large increase of the commutation voltage from the start, damping capacitors 15a–15f are provided, one of the damping capacitors 15a to 15f being connected parallel to each bridge arm of the inverter 6 in the example according to FIG. 1. All damping capacitors 15a to 15f have the same capacity. The ratio of the individual capacities of the commutating capacitors 11a–11c to those of the damping capacitors 15a–f is about 5:1 and the ratio of the capacities of the damping capacitors to the capacity of the link capacitor 5 is about 1:1000.

In the described arrangement, the link voltage in the intermediate d-c link 3 and, thereby, the magnitude of the voltage which is fed to the three phase machine 1, is controlled through control of the rectifier 2. The frequency of the machine voltage is determined by the timing pulse rate of the main thyristors of the inverter 6 and the direction of rotation of the three phase motor through the sequence of current conduction of the main thyristors of the inverter 6. For the control of the thyristors of the rectifier 2, conventional control units such as are described, for instance, in the book by G. Moeltgen, "Line-commutated Converters with Thyristors," published by Siemens A.G. 1967, page 275 or 280, and in DIN 41 57, Sheet 7, page 4, are used. The inverter 6 and the quenching thyristors 10a to 10f are addressed by a control unit which contains a pulse generator followed by a ring counter. The control units and the control lines to the firing electrodes of the thyristors are not shown in the figures in order to preserve the clarity of presentation.

To start up the arrangement the commutating capacitors 11a to 11c must be charged to the voltage required for commutating the starting current. For this charging the main thyristors 7a to 7f and the corresponding quenching thyristors 10a to 10f can be fired or a conventional charging device can be provided for each commutating capacitor; this device (not shown in FIG. 1) may contain, for instance, a charging resistor in series with a switch, permitting the associated commutating capacitor to be connected with a d-c voltage source. After the charging is completed the switches are reopened. If sufficiently large resistances, e.g., 100 kohm or more, are employed, the switches can be omitted.

Figure 2:
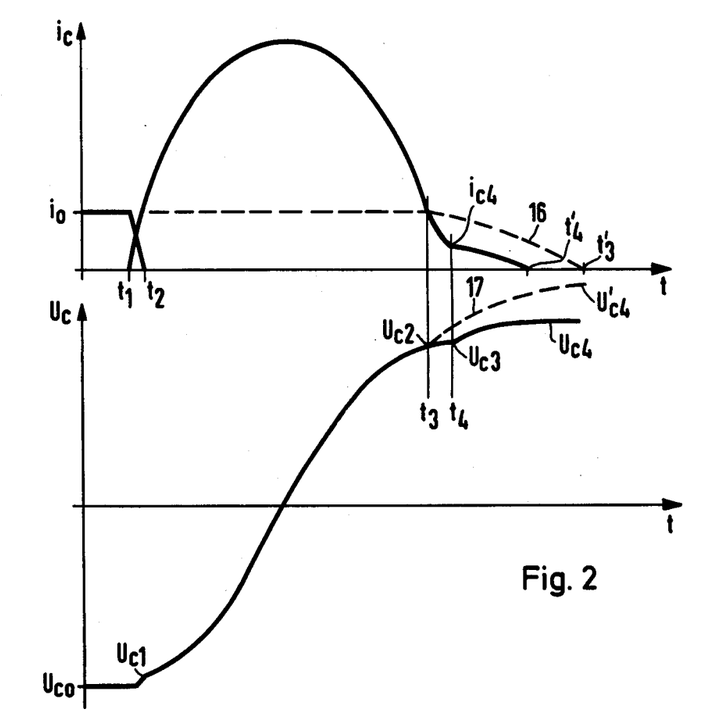
FIG. 2 is a set of curves comparing operation of the prior art commutating arrangement with that of the present invention.

For an understanding of the forced commutation, reference is made to FIG. 2. In the diagram shown therein the current $i_c$ in the commutation circuit, the load current $i_o$ carried by the thyristor which is to be quenched, and the capacitor voltage $U_c$ are plotted versus time $t$. The dashed curves 16 and 17 show the currents and voltages which occur in the commutation process of the prior art cycloconverter and the solid curves the condition which adjusts itself in an arrangement equipped with damping capacitors 15a–f. It is assumed that the commutating capacitors 11a to 11c are charged to the voltage $U_{co}$ with the polarity shown that the main thyristors 7a, 7b and 7f are carrying current and that the load current is to be commutated from the main thyristor 7a to the main thyristor 7d. With the indicated charge of the commutating capacitors 11a to 11c, the main thyristors 7a and 7b of the left bridge half and the main thyristor 7f of the right bridge half can be force commutated. For extinguishing the current carrying main thyristor 7a, the associated quenching thyristor 10a is fired at the time $t_1$. The discharge current of the commutating capacitor 11a now flows through the quenching thyristor 10a, the limiting choke 13a and the main thyristor 7a and decreases the load current in the main thyristor 7a. When the discharge current reaches the value of the load current in the main thyristor 7a at the time $t_2$, the main thyristor 7a is extinguished and the part of the voltage $U_{cl}$ of the commutating capacitor 11a dropping across the commutating choke 12a appears as a negative reverse voltage at the main thyristor 7a. The load current continues to flow through the commutating capacitor 11a, the quenching thyristor 10a, the limiting choke 13a and the commutating choke 12a. The charge of the commutating capacitor 11a is now reversed through the commutation circuit, i.e., through the commutating choke 12a, the limiting choke 13a and the bypass diode 8a. In this resonant circuit, the reversal current $i_c$ of the commutating capacitor 11a increases sinusoidally to its maximum value which is reached when the capacitor voltage $U_c$ goes through zero. Thereupon, the reversal current, which is now driven by the commutating choke 12a and the limiting choke 13a, decreases again. As soon as the reversal current has reached the magnitude of the load current $i_o$ at the time $t_3$, the current becomes zero due to the bypass diode 8a and the load current starts to be commutated to the bypass diode 8d, which now begins to conduct. This means that the potential of the main lead terminal 14a changes from minus to plus. At this point in time a further transient starts including the link voltage $U_z$. Its initial conditions are the voltage $U_c2$ at the commutating capacitor 11a and the current value $i_o$ in the reversal circuit. Therefore, during the commutation to the bypass diode 8d a current which is also driven by the commutating choke 12a and the limiting choke 13a and has a waveform as shown by the dashed curve 16 of FIG. 2 flows and leads to a voltage waveform at the commutating capacitor 11a as shown by the dashed curve 17. The voltage at the commutating capacitor therefore rises from $U_{c2}$ to $U'_{c4}$ in accordance with the current time area $$\int_{t_3}^{t_3'} i_c \, dt,$$

where $t_3'$ is the instant of the zero crossing. This corresponds to a current depending recharging of the commutating capacitor 11a by the commutating choke 12a and the limiting choke 13a. In the stationary case, $U'_{c4} = U_{co}$ applies. With this current dependent recharging of the commutating capacitors 11, the cycloconverter operation is ensured for small link voltages $U_z$ and, therefore, also for low frequencies. It is a characteristic of such commutation that with large load currents the commutation voltage becomes larger than with small load currents. In the event of an overload of the cycloconverter this current dependent recharging can therefore lead to excessively high commutation voltages as noted above. When the commutation to the bypass diode 8d is completed, the quenching thyristor 10a is extinguished and the commutating capacitor 11a has the correct polarity and voltage for forced quenching of the main thyristor 7d, where the polarity is the reverse of that shown in FIG. 1. Due to the commutation of the load current to the bypass diode 8d, which takes place through the influence of the inductance of the windings of the three phase machine 1, a bypass circuit is closed and the current flows through the bypass diode 8d, the commutating choke 12d, the current-carrying main thyristors and the windings of the motor 1. Now the main thyristor 7d is fired and takes over the current, and the commutation is completed.

In order to prevent the current dependent recharging from leading to excessively large commutation voltages in the case of a large load current, particularly with an overload of the cycloconverter, the damper capacitors 15 are provided in the cycloconverter according to the present invention. These capacitors have equal capacities and one damping capacitor 15a to 15f is shunted across each bridge arm of the inverter 6 in the embodiment of FIG. 1. During the reversal in the commutating circuit, i.e., with the bypass diode 8a conducting, the main terminal lead 14a has the potential $-U_Z$ volts. From this, it follows that the voltage at the damping capacitor 15a is 0 volts and that at the capacitor 15d, $-U_Z$ volts, when the reversal current $i_c$ at the time $t_3$ again reaches the magnitude of the load current $i_o$. The damping capacitor 15d has the polarity indicated here. At the time $t_3$, the bypass diode 8a becomes currentless. But because of the voltage at the damping capacitor 15d, the potential of the main terminal lead 14a cannot change from minus to plus until the charges on the damping capacitors 15a and 15d are reversed. The charging of the damping capacitor 15a and the discharging of the damping capacitor 15d and, therefore, the change of potential takes place with limited speed and are completed at the time $t_4$. Now the bypass diode 8d begins conducting and the commutation to this bypass diode starts. However, during the time interval $t_3$ to $t_4$, the reversal current $i_c$ has decayed from $i_o$ to $i_{c4}$. Thus, the second transient which occurs during the commutation to the bypass diode 8d as in the known cycloconverter and, therefore, the current dependent recharging, takes place under changed conditions. For this second transient, the starting conditions are $i_{c4} < i_o$ and $U_{c3} > U_{c2}$. With these conditions the current time area, i.e., $$\int_{t_4}^{t_4'} i_c \, dt,$$

is smaller than with the prior art cycloconverter without a damping circuit. This is equivalent to a lowering of the commutation voltage to $U_{c4}$, where $U_{c4} < U_{c4}$ and $t_4'$ is again the instant of zero crossing of the current. The difference between the current time areas in the cycloconverter with the damping circuit and in the prior art cycloconverter can be seen directly from the dashed curves 16 and 17 and the solid curves of FIG. 2.

By means of the damping capacitors 15a-f which prevent the load current from being commutated directly from the bypass diode 8a to the bypass diode 8d, an overvoltage at the commutating capacitors 11 is directly prevented from being generated. As is self evident, the damping circuit remains without effect if the link voltage is zero, since the current can be commutated to the bypass diode 8d without being impeded. This commutation is delayed more, and the recharging time and the commutation voltage are decreased relatively, the higher the link voltage, since under these conditions the charge reversal of the damping capacitors, which participate in the commutation process, takes longer. Thus, there is less current dependence of the commnutation with increasing link voltage. With this characteristic, operation of the commutation arrangement and damping device, which is almost without loss and completely independent of the cycloconverter frequency is provided. It should also be noted that with external charging of the commutating capacitors the link voltage is not increased by the auxiliary voltage.

Figure 3:
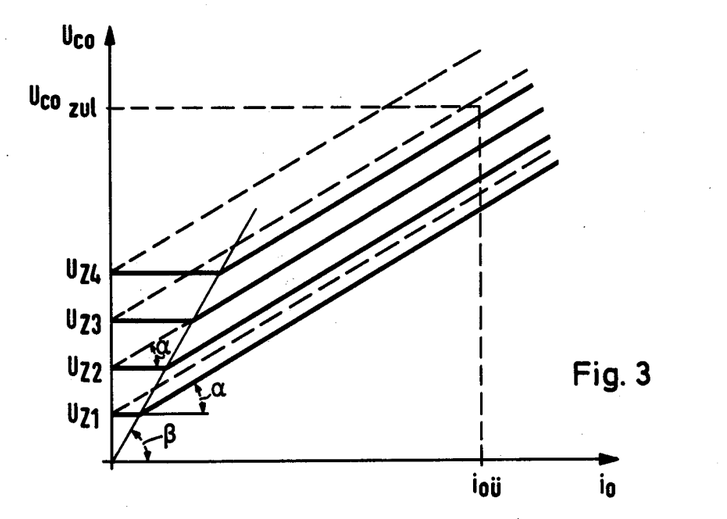
FIG. 3 is a further set of curves used for comparison.

For the characteristics $U_{co} = f(U_z, i_o)$ in the prior art cycloconverter without a damping circuit the following approximate relation is obtained:

$$U_{co} = U_z + i_o \cdot Z' \tag{1}$$

where the current dependency factor $Z'$ is a modified wave impedance of the reversal circuit. For the cycloconverter according to the invention with a damping circuit, the following approximation is obtained.

$$U_{co} = U_Z + Z'(i_o - U_Z/Z_D) \text{ for } I_o \cdot U_Z/Z_D > 0 \tag{2}$$

and $$U_{co} \approx U_Z \text{ for } i_o - U_Z/Z_D \leq 0, \tag{3}$$

where the factor $Z_D$, with a given damping arrangement, depends on the capacity of the damping capacitors 15a-f which participate in the commutation process. The characteristics according to the equations (1) or (2) and (3) are shown in FIG. 3 for different link voltages $U_{Z1}$ to $U_{Z4}$. The characteristics of the known cycloconverter according to equation (1) are indicated again as dashed curves and the characteristics of the cycloconverter according to the invention according to equations (2) and (3) as solid curves. The angles $\alpha$ and $\beta$ illustrated are related to $Z'$ and $Z_D$ as follows: $\tan\alpha = Z'$ and $\tan\beta = Z_D$. It is evident from FIG. 3 that, for the cycloconverter with a damping circuit, considerably larger overload currents $i_{01}$ are permissible for a given linkvoltage $U_z$ and for a maximum permissible commutation voltage $U_{co_{zul}}$.

Figure 4:
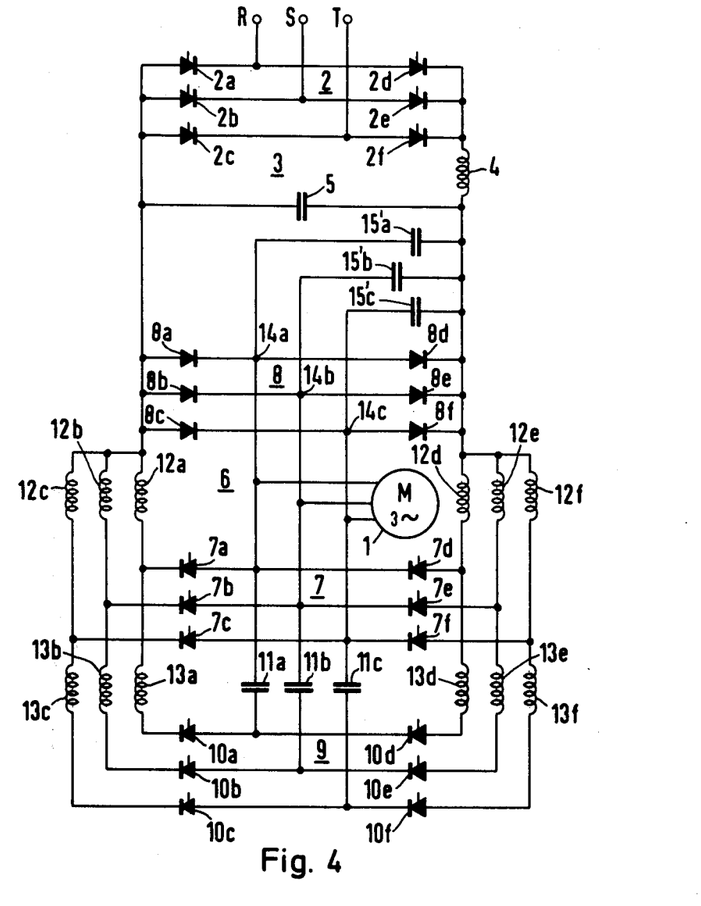
FIG. 4 is a circuit diagram of a second embodiment of the present invention.

FIG. 4 illustrates a second embodiment of the present invention. Instead of six damping capacitors 15a to 15f, only three damping capacitors 15a' to 15c' are provided in this embodiment, each damping capacitor 15a' to 15c' being shunted across a bridge arm of a bridge branch of the cycloconverter 6. It is evident that this current does not differ from the embodiment according to FIG. 1 as far as the operation is concerned. However, in order to obtain the same damping as in the embodiment of FIG. 1, the capacity of the damping capacitors 15a' to 15c' must be twice the capacity of the damping capacitors 15a to 15f of the embodiment according to FIG. 1.

Figure 5:
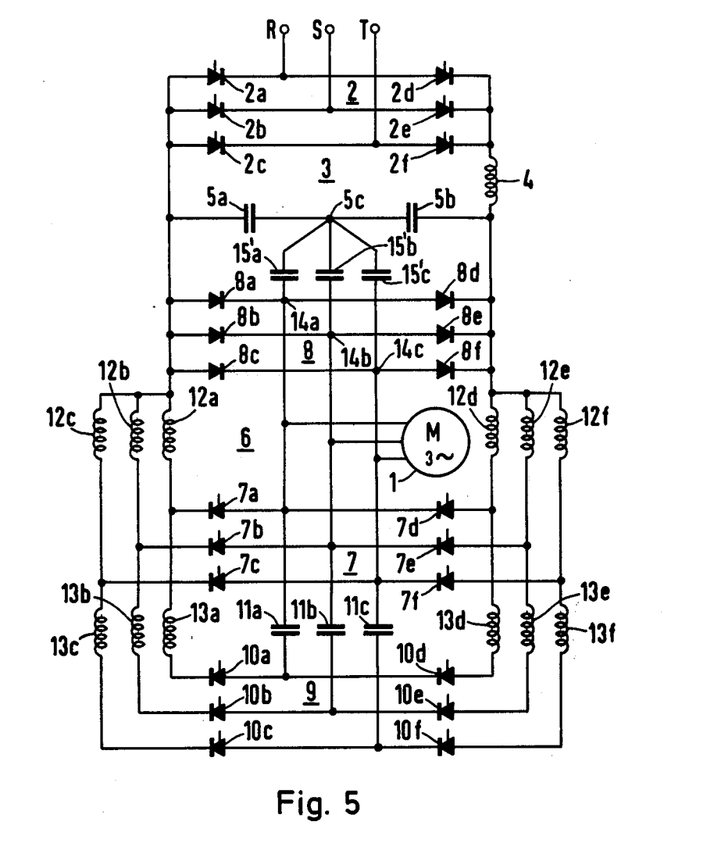
FIG. 5 is a circuit diagram of a third embodiment of the present invention.
Figure 6:
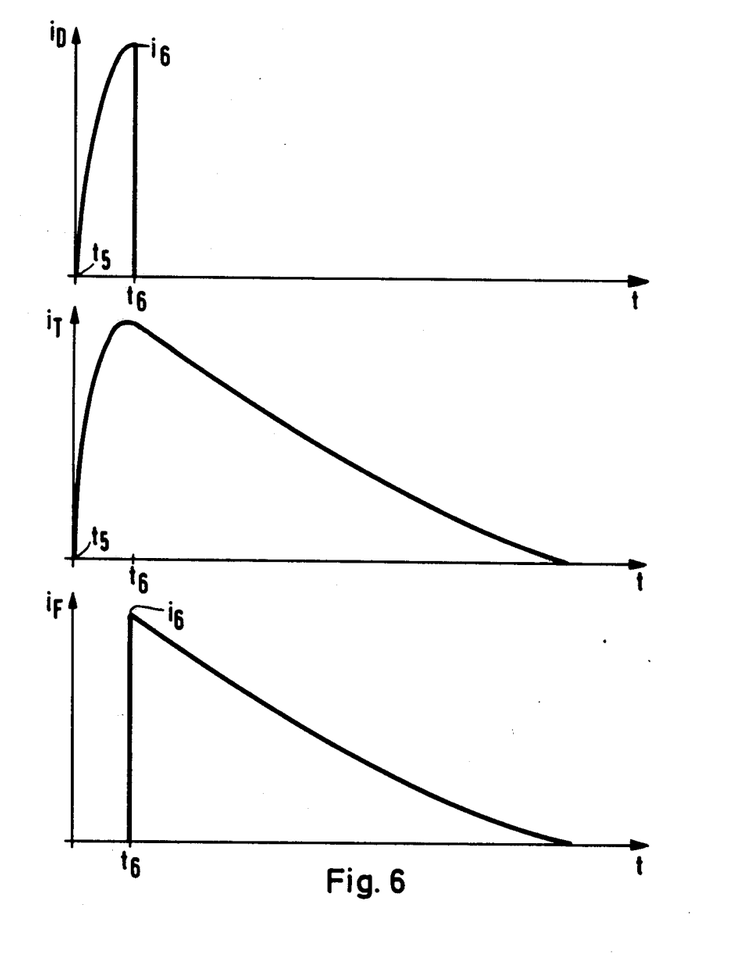
FIG. 6 is a series of curves showing the manner in which circulating currents occur.

The circuit of a third embodiment is shown in FIG. 5. In this embodiment, two intermediate link capacitors 5a and 5b are used. But only one damping capacitor 15a' to 15c' is again provided for each bridge branch, each damping capacitor 15a' to 15c' being connected between the main terminal lead 14a to 14c of the associated bridge branch and the center tap 5c of the intermediate link capacitors. The operation of this circuit also does not differ from that of FIG. 1. In contrast to the circuit examples according to FIGS. 1 and 4, however, in which the damping capacitors are subjected to a maximum voltage stress of $+U_Z$, the damping capacitors 15 of the embodiment according to FIG. 5 are subjected only to $\pm U_Z/2$.

In the embodiments according to FIGS. 1, 4 and 5, the size of the damping capacitors 15 and therefore, the damping action, is limited only by the circulating currents occurring with the cycloconverter in the idling condition. The origin of these circulating currents will now be described in connection with a description of the commutation process for FIG. 4 with the aid of FIG. 6. An idling cycloconverter is assumed, i.e., it is assumed that no load current flows. Without load current, the damping capacitor 15a can not be charged after the reversal of the commutating capacitor 11a. If the main thyristor 7d is now fired at the time $t_5$, a transient begins through the commutating choke 12d, the main thyristor 7d and the damping capacitor 15a. The current $i_D$, which flows via the damping capacitor 15a, the current $i_T$ flowing via the main thyristor 7d and the current $i_F$ flowing via the bypass diode 8d are plotted on FIG. 6 versus time $t$. When the voltage at the damping capacitor 15a reaches zero volts at the time $t_6$, the current of magnitude $i_6$ flowing in the commutating choke 12d is commutated to the bypass diode 8d. Thereupon, the circulating current decays. For the case of the circulating current decaying within the firing period of the current carrying main thyristor, the loss energy is:

$$P = U_Z^2 \cdot C_{15} \cdot f_{umr}$$

where $C_{15}$ is the capacity of the participating damping capacitor 15 and $f_{umr}$ is the frequency of the cycloconverter. These losses and, thereby, the limitation in capacity value of the damping capacitors 15 can be avoided if the damping capacitors 15 are disconnected when the load current falls below a minimum value or if the output of the cycloconverter is loaded with an inductive base load.

Figure 7:
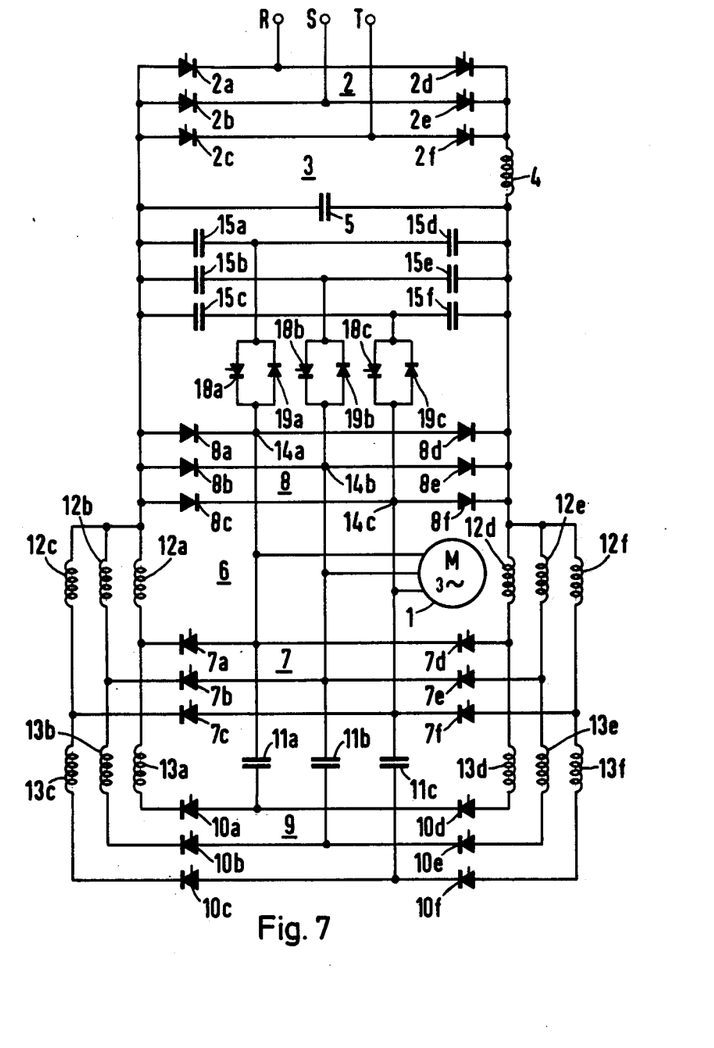
FIG. 7 is a circuit diagram of a fourth embodiment of the present invention in which the damping capacitors are switched out for low loads.

An embodiment in which the damping capacitors 15 can be disconnected is shown in FIG. 7. In this embodiment thyristors are used as switches. Mechanical switches may also be used. This embodiment is identical with the embodiment according to FIG. 1. The only difference is that the damping capacitors 15a to 15f are connected through respective thyristors 18a to 18c to the main terminal leads 14a to 14c of their associated bridge branch. A diode 19a to 19c is connected antiparallel to each of the thyristors 18a to 18c. The thyristors 18a to 18c disconnect the damping capacitors when the load current falls below a minimum value in order to avoid the development of circulating currents and the losses connected therewith.

Figure 8:
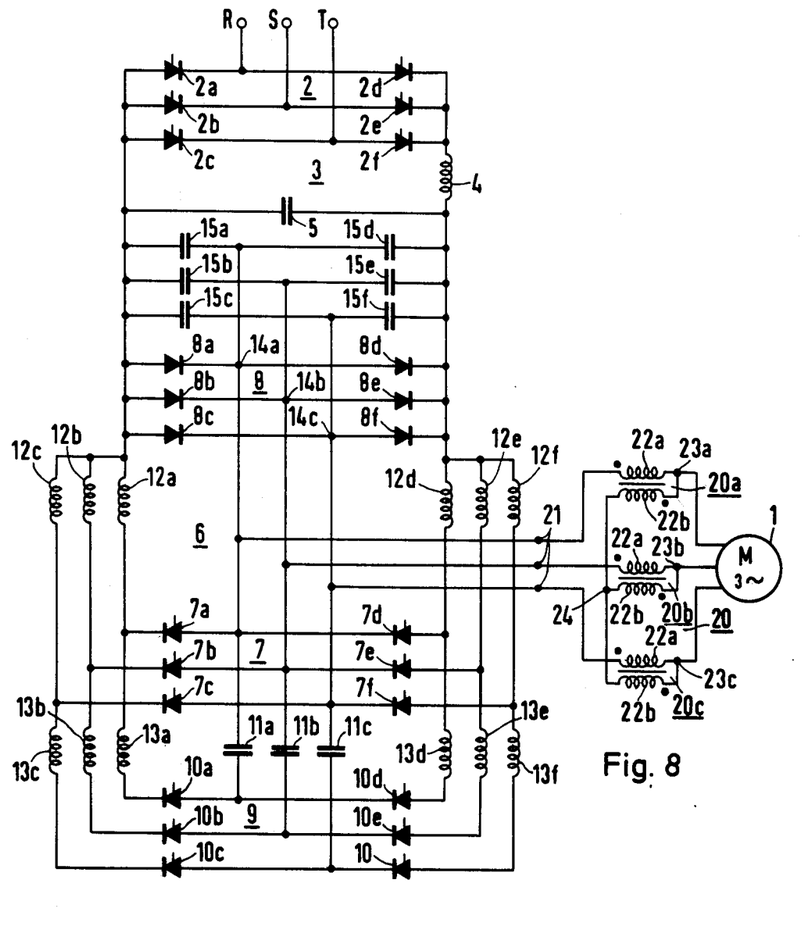
FIG. 8 is a circuit diagram of a fifth embodiment of the present invention in which a base load is used to prevent circulating currents.

FIG. 8 shows an embodiment of the present invention including an inductive base load 20 which load 20 causes an inductive base load current which reverses the charge of the damping capacitors 15 between the reversal transient and the firing of the next main thyristor in the cycloconverter 6 to flow and thus prevents a circulating current from being generated. The cycloconverter and the arrangement of the damping capacitors 15a–f correspond to the embodiment according to FIG. 1. Chokes 20a to 20c are connected into each phase of the cycloconverter output as the base load between the cycloconverter output 21 and the three phase machine 1. Each of the chokes 20a to 20c has two magnetically coupled windings 22a and 22b; the number of turns of each winding 22a is $n_1$ and the number of turns of each winding 22b is $n_2$, and $N_2 \gg n_1$. The dots at the windings 22a and 22b designate the starts and ends of the windings. In each choke 20a to 20c, the start of the winding 22a is connected to a cycloconverter output 21. The junction point 23a to 23c between the winding ends of the windings 22a and winding starts of the windings 22b are connected to a phase of the load 1. The load current thus flows through the winding 22a of all chokes 20a to 20c. The ends of all windings 22b of the chokes 20a to 20c are tied together at the junction point 24. In the embodiment according to FIG. 8, the base load 20 is obtained with a three phase choke on each leg of which two windings 22a and 22b are wound, and the junction point 24 of which is connected to the Y-point of the cycloconverter output.

Figure 8A:
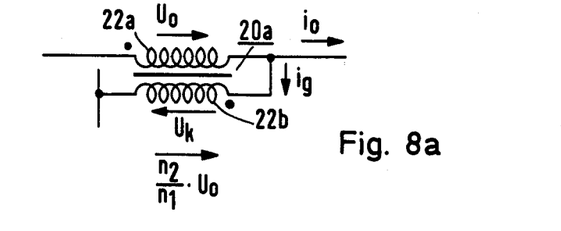
FIG. 8a is a circuit diagram of an inductor used in the base load of FIG. 8 showing current flow.
Figure 9A:
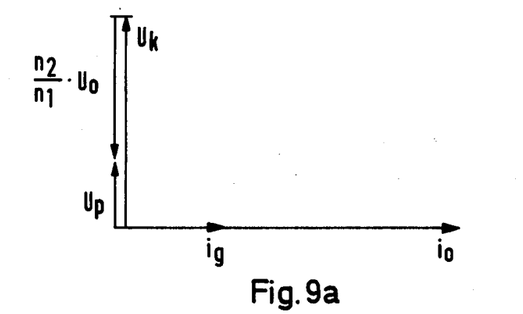
FIGS. 9a–c are vector diagrams illustrating the effect of the base load of FIG. 8.
Figure 9B:
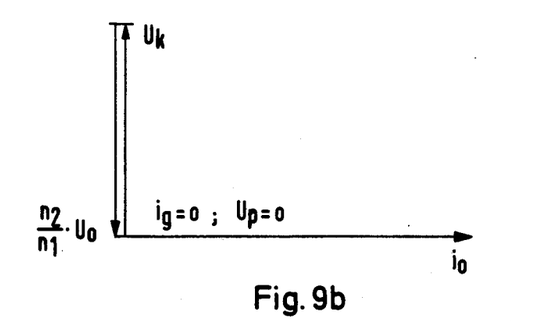
Figure 9C:
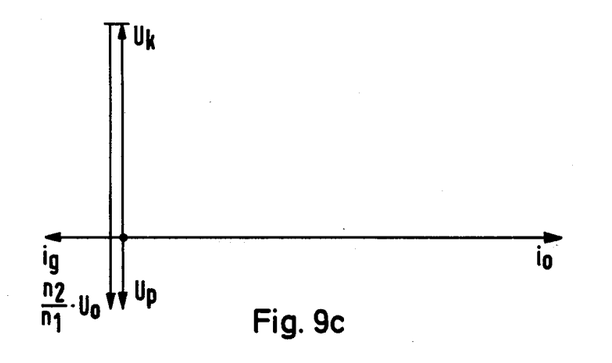

To explain the function of the base load 20, the choke 20a with the voltages and currents that occur therein is shown in detail on FIG. 8a. With the cycloconverter in idling operation, only the base load current $i_g$ flows. If a load current $i_o$ is impressed by the cycloconverter load, this load current causes a voltage drop $U_o$ in the winding 22a. In the winding 22b, a voltage $(n_2/n_1) \cdot U_o$ is induced thereby. If the load current is inductive, the voltage $(n_2/n_1) \cdot U_o$ is opposed to the cycloconverter Y-voltage $U_k$, so that a base load current $i_g$ is driven by the resultant voltage $U_p = U_k - (n_2/n_1) \cdot U_o$. For $U_p > (n_2/n_1) \cdot U_o$ (FIG. 9a), $i_g$ is inductive, for $U_p = (n_2/n_1) \cdot U_m$ (FIG. 9b), $i_g = 0$ and for $U_p < (n_2/n_1) \cdot U_o$ (FIG. 9c), $i_g$ becomes capacitive. This presentation is greatly simplified but holds if $i_o \gg i_g$, which can be assumed for the application ($i_g \approx 0.1\ i_o$). In FIGS. 9a to 9c, the three cases mentioned above are shown as vector diagrams, assuming sinusoidal voltages and currents.

As described above, the choke arrangement causes a base load current to flow which reverses the charge of the damping capacitors between the reversal process and the start of the main pulse in the cycloconverter and thus prevents a circulating current from being generated. It is important that this embodiment allows the base load current to be made smaller with increasing cycloconverter load current and, with suitable design of the three phase choke 20, to be made zero at the nominal current. For rated operation, the base load 20 is therefore no longer a load for the commutation arrangement and the main thyristors. This relationship applies where the cycloconverter current is inductive, which is true in a majority of cycloconverter applications. With an increasing active component in the inductive load current, an increasingly larger share of the inductive base load current is retained, so that in the extreme, with a purely ohmic load on the cycloconverter, the base load current can reverse the charge of the damping capacitors. It should also be pointed out that the inductive base load has no adverse effect of any kind on the operating safety of the cycloconverter.

In summary, it can be said that an increase of the voltage at the commutating capacitor is prevented from occurring with the cycloconverter according to the present invention. It is important in this connection that the damping effect is small for small intermediate link voltages and increases with increasing link voltage. Thereby, the current dependence of the recharging is preserved to the extent that the necessary ability to commutate remains assured. Operation completely independent of the cycloconverter frequency is thereby accomplished. In the prior art cycloconverters the magnitude of the commutation voltage enters strongly into the cycloconverter losses. The losses in the commutating arrangement are 80 to 90% of the total losses. In the cycloconverter according to the present invention, the damping circuit operates almost without losses. At high link voltages, it noticeably reduces the stress on the commutating arrangement by lowering the high commutation voltages, which can only be partially utilized. This also substantially improves the overall efficiency of the cycloconverter. Losses which occur due to circulating currents when the cycloconverter is idling, can be eliminated almost completely by disconnecting the damping circuit for small link voltages or, preferably, by providing an inductive base load.

In conclusion, it should also be mentioned that the damping circuit described herein is also suited for retrofitting prior art cycloconverters, since the cost thereof is negligible. Through such an increase of the output power yield can be obtained.

Thus, an improved cycloconverter commutating arrangement has been shown. Although specific embodiments have been illustrated and described, it will be evident to those skilled in the art that various modifications may be made withou departing from the spirit of the invention which is intended to be limited solely by the appended claims.

What is claimed is:

1. In a cycloconverter having an intermediate d-c link, a controlled rectifier and an inverter with main thyristors in a bridge circuit, to which bypass diodes in a bridge circuit are connected with opposite polarity with a quenching circuit including a quenching thyristor and a commutating capacitor connected in parallel to each bridge arm, one commutating capacitor being provided for each two bridge arms which have a common main terminal lead, and commutating chokes arranged in the commutating circuits, the improvement comprising at least one damping capacitor coupled in parallel to a bridge arm for each two bridge arms with a common terminal lead.

2. Apparatus according to claim 1 wherein the capacity of all damping capacitors is at least approximately the same.

3. Apparatus according to claim 1 wherein a damping capacitor is coupled in parallel to each bridge arm.

4. Apparatus according to claim 3 wherein the capacity of all damping capacitors is at least approximately the same.

5. Apparatus according to claim 1 wherein said intermediate link includes an intermediate link capacitor made up of two capacitors in series across the link voltage and one damping capacitor is coupled between the common main terminal lead for each two bridge arms and the center tap of the intermediate link capacitors.

6. Apparatus according to claim 5 wherein the capacity of all damping capacitors is at least approximately the same.

7. Apparatus according to claim 1 and further including a switch connected between each respective main terminal lead for two bridge arms and the associated damping capacitors.

8. In a cycloconverter having an intermediate d-c link, a controlled rectifier and an inverter with main thyristors in a bridge circuit, to which bypass diodes in a bridge circuit are connected with opposite polarity with a quenching circuit including a quenching thyristor and a commutating capacitor connected in parallel to each bridge arm, one commutating capacitor being provided for each two bridge arms which have a common main terminal lead, and a commutating choke arranged in the commutating circuits, the improvement comprising at least one damping capacitor coupled in parallel to a bridge arm for each two bridge arms with a common terminal lead and an inductive base load coupled to the output of the cycloconverter.

9. Apparatus according to claim 8, wherein said base load comprises a choke with two magnetically coupled windings coupled into each output line of the cycloconverter with one winding of each choke coupled to the inverter output, the junction point of the two windings of each coupled to the load and the other windings of all chokes coupled with each other.

10. Apparatus according to claim 9 wherein the capacity of all damping capacitors is at least approximately the same.

* * * * *